United States Patent

Hoshimi et al.

[11] Patent Number: 5,235,478
[45] Date of Patent: Aug. 10, 1993

[54] DISC DRIVE APPARATUS WITH SERVO TRACKS OFFSET FROM DATA TRACKS

[75] Inventors: Susumu Hoshimi, Kanagawa; Hiroyuki Suzukawa, Tokyo, both of Japan

[73] Assignee: Sony Corporation, Japan

[21] Appl. No.: 625,487

[22] Filed: Dec. 11, 1990

[30] Foreign Application Priority Data

Dec. 15, 1989 [JP] Japan .................. 1-325215
Dec. 15, 1989 [JP] Japan .................. 1-325216

[51] Int. Cl.⁵ .............................................. G11B 5/82
[52] U.S. Cl. .................................. 360/77.08; 360/135
[58] Field of Search ............... 360/77.04, 77.06, 77.07, 360/77.08, 118, 135

[56] References Cited

U.S. PATENT DOCUMENTS

| | | | |
|---|---|---|---|
| 4,594,622 | 6/1986 | Wallis | 360/77.04 |
| 4,802,033 | 1/1989 | Chi | 360/77.04 |
| 4,912,585 | 3/1990 | Belser et al. | 360/135 |

FOREIGN PATENT DOCUMENTS

0194641 9/1986 European Pat. Off. ........ 360/77.04

Primary Examiner—Joseph L. Dixon
Assistant Examiner—David L. Robertson
Attorney, Agent, or Firm—Ronald P. Kananen

[57] ABSTRACT

A disc drive apparatus with a tracking servomechanism, comprising at least one disc medium having data surfaces where servo signal and data signal are recorded; transducer means having a first head for reproducing the data signal from the data tracks in a playback mode, and a second head for recording the data signal on the data tracks in a recording mode; a rotary arm for supporting the transducer means at one end thereof; actuator motor means for driving the rotary arm in a manner to move the transducer means over the data tracks; servo signal processing means for receiving and processing the servo signal reproduced by the transducer means and outputting first and second servo control signals; and positioning control means for controlling the actuator motor means in the playback and recording modes respectively in accordance with the first and second servo control signals so that the first head of the transudcer means is positioned precisely on any selected one of the data tracks in the playback mode and also that the second head is positioned precisely on any selected one of the data tracks in the recording mode.

9 Claims, 12 Drawing Sheets

DISC DRIVE APPARATUS WITH SERVO TRACKS OFFSET FROM DATA TRACKS

BACKGROUND OF THE INVENTION

1. Field of the Invention

The present invention relates to a tracking servomechanism for a disc drive apparatus having a playback head and a recording head attached individually to a rotary support arm.

2. Description of the Prior Art

The conventional head displacement means known heretofore for use in a disc drive apparatus are generally classified into a linear type which moves a support arm linearly to displace a head in the radial direction of a disc, and a rotary type which rotates a support arm to displace a head in the radial direction of a disc. To realize a compact and lightweight structure of the drive apparatus, the rotary type is considered to be preferable.

Meanwhile, a magnetoresistive type head capable of exhibiting excellent playback sensitivity characteristics even in a narrow track width has been developed to meet the requirement of achieving a higher track density. However, the magnetoresistive type head has no recording function. Therefore, when such magnetoresistive type head is employed, it is necessary to provide a recording head in addition thereto.

Under the condition mentioned, it is still possible to produce a high density recording/reproducing disc drive apparatus of a compact and lightweight structure by using a rotary support arm and attaching a playback head and a recording head individually to such support arm.

Figure 1:
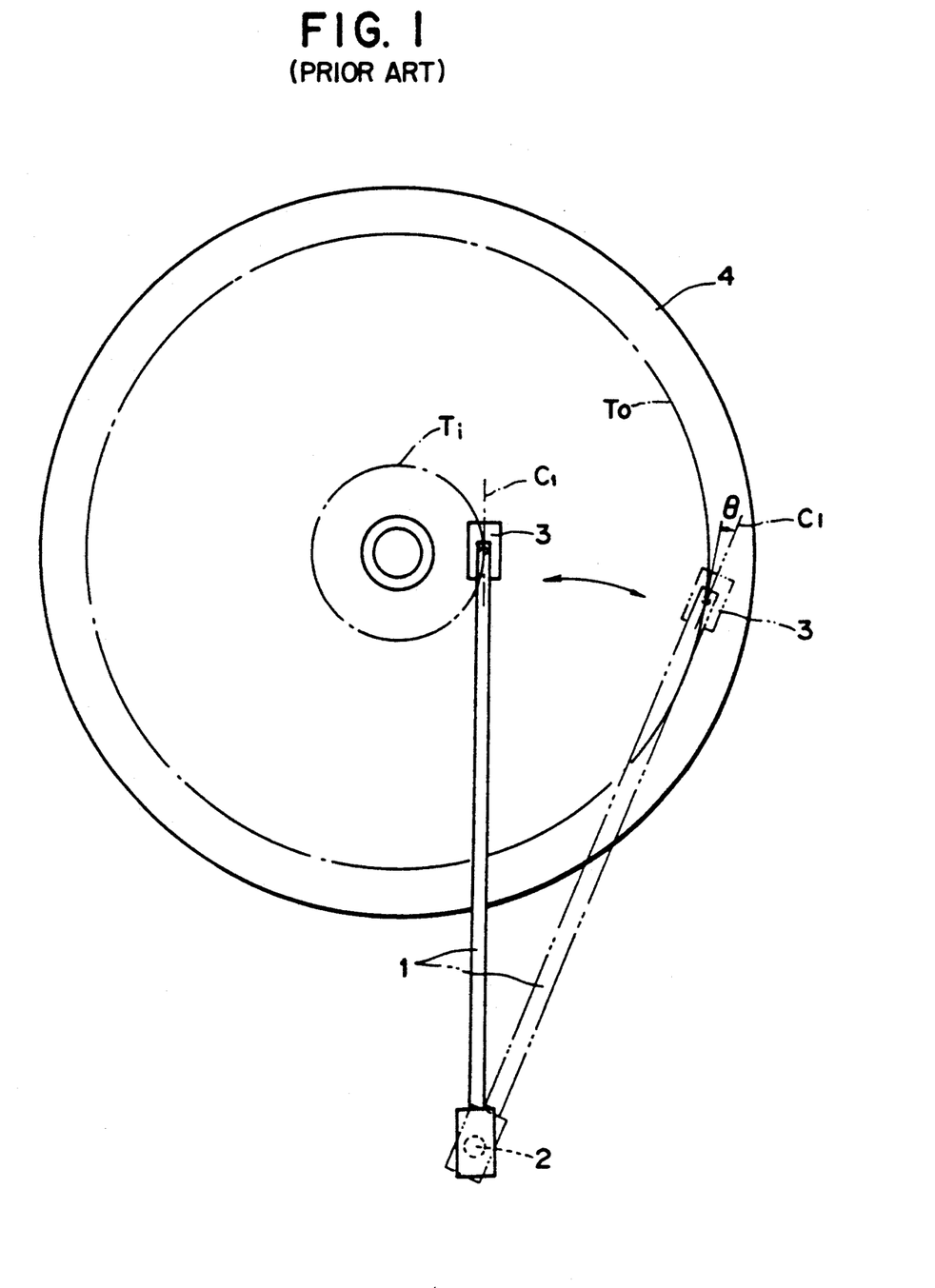
FIG. 1 schematically illustrates the structure of a known disc drive apparatus.
Figure 2:
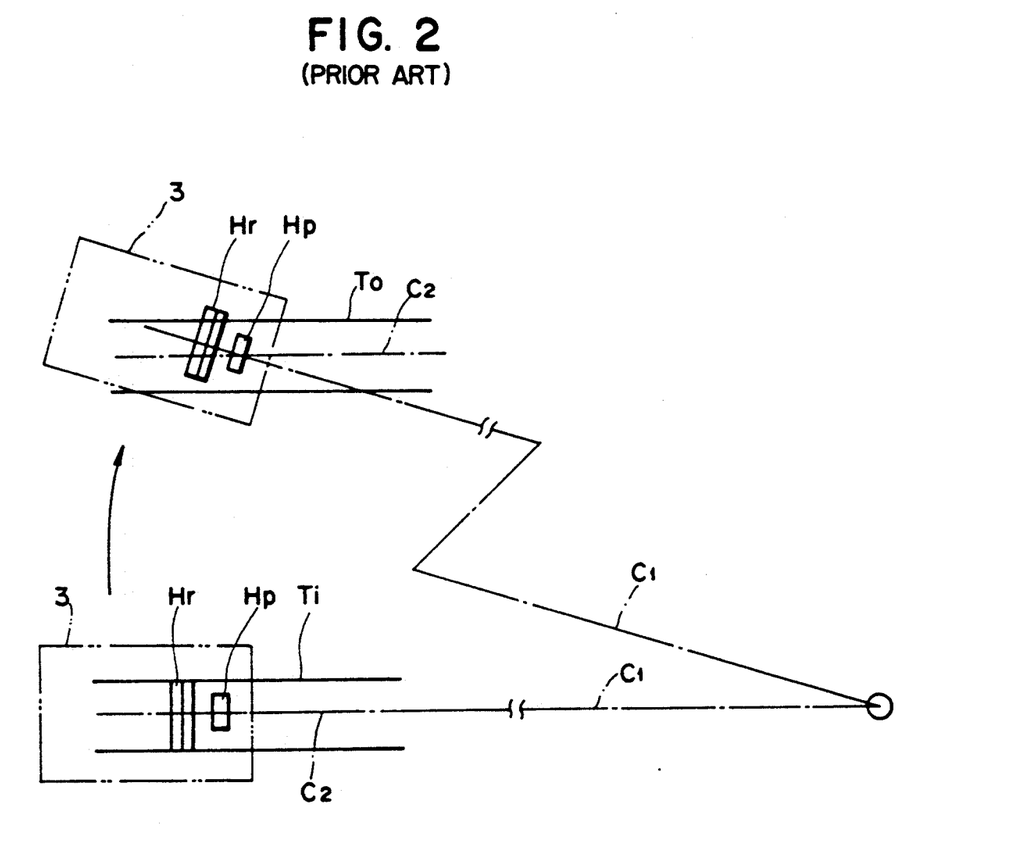
FIG. 2 illustrates a positional state of heads disposed with respect to track position in a conventional example.

FIG. 1 schematically illustrates the structure of a conventional disc drive apparatus equipped with a rotary actuator, in which a base end of a support arm 1 is held rotatably by a rotary shaft 2. This shaft 2 is rotated by a driving force of an unshown motor to control the position of the support arm 1. A slider 3 is attached to a distal end of the support arm 1, and a magnetoresistive type playback head Hp and a coil type recording head Hr are secured to the slider 3 as illustrated in FIG. 2. The playback head Hp and the recording head Hr are disposed on a center line Cl of the support arm 1 while being spaced apart by a predetermined distance from each other, in such a manner that the recording head Hr is set at a front position while the playback head Hp is set at a rear position. The playback head Hp and the recording head Hr are so arranged as to be both in an exact tracking or "just-tracking" state at an innermost servo signal track Ti on a disc 4. Therefore at any other track, the recording head Hr is placed in an off-tracking state when the playback head Hp is at a "just-tracking" position.

In such known disc drive apparatus equipped with a rotary actuator as shown in FIG. 1, the angle formed by the slider 3 and the tangential direction C to each track is changed in accordance with the track position. FIG. 1 represents an exemplary case where a directional coincidence is attained therebetween at the innermost track position Ti. The above angle gradually increases in accordance with the displacement of the slider 3 toward the periphery of the disc and finally reaches a maximum value $\theta$ at the outermost track position To.

Figure 3A:
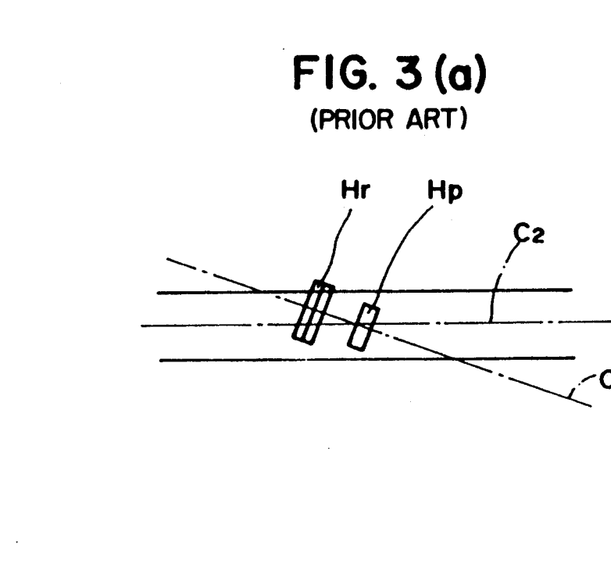
FIG. 3(a) illustrates a scanning state of heads in a recording mode in the conventional example.
Figure 3B:
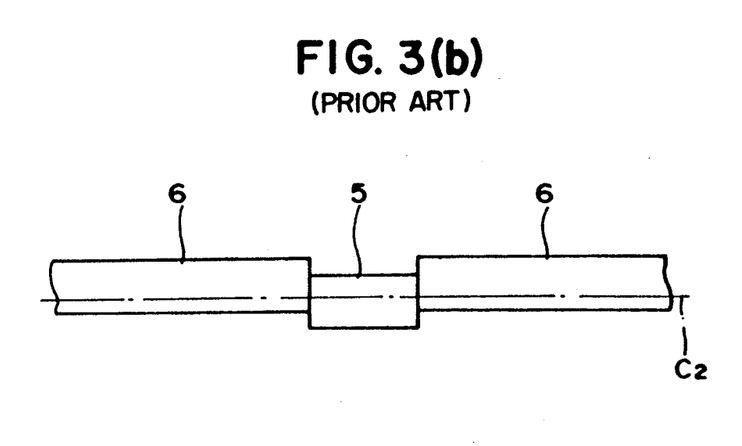
FIG. 3(b) illustrates a recording state in the conventional example.

In an exemplary case of FIG. 2 where the recording head Hr and the playback head Hp are so disposed on the slider 3 that the respective centers thereof are positioned exactly at the center line C2 of the innermost track Ti, when the rotary arm is controlled for aligning the center of the playback head Hp with the center line of any other track, the center of the recording head Hr comes to be positioned at a point deviated from the center line C2 of the track. When a tracking servo control is executed while a tracking servo signal prerecorded on the disc is read out therefrom by the playback head Hp, the center of the playback head Hp can be exactly positioned with respect to the track center, but there exists a positional deviation between the center of the recording head Hr and any other track center except the innermost track. Consequently, if a recording mode is executed in a state where merely the playback head Hp alone is aligned with the track center line as shown in FIG. 3, a newly recorded data track is formed with a positional deviation from the preceding data track. And when the signal recorded in this manner is reproduced, there arises a problem that some noise or read error is induced since the playback head Hp is so controlled that the center is continuously positioned on the track center line C2 while the recording head Hr scans the off-track position of the data signal at any track other than the innermost track Ti.

Figure 4:
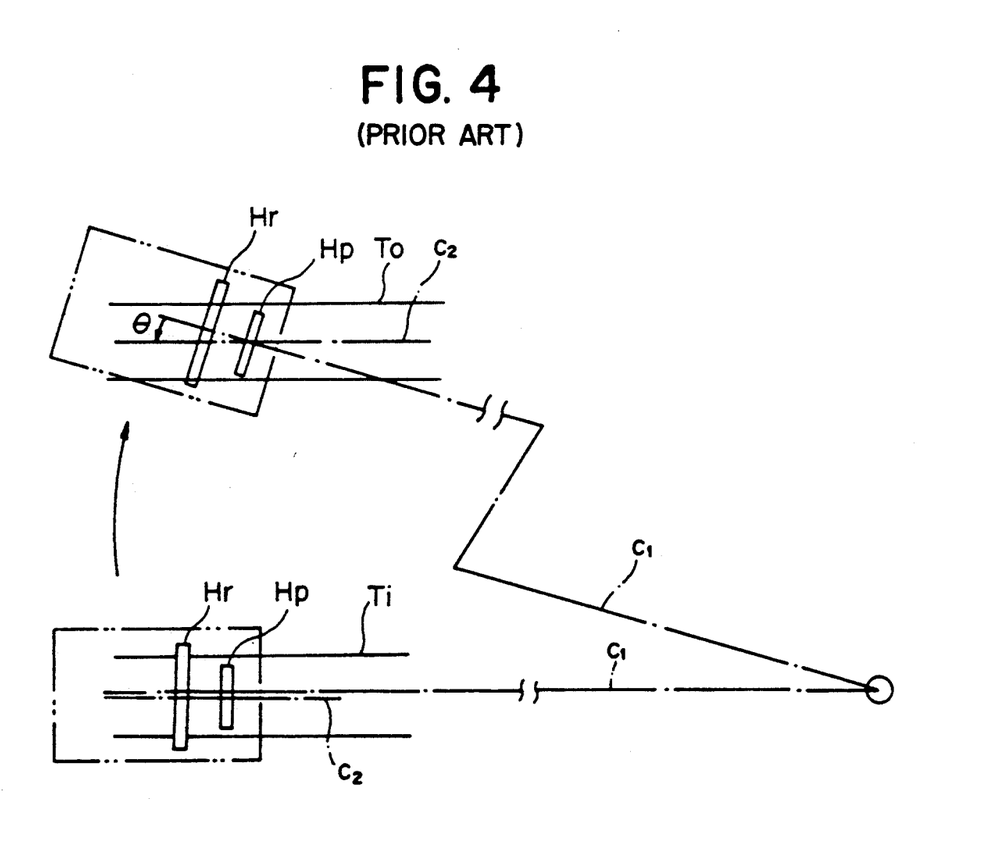
FIG. 4 illustrates a positional state of heads disposed with regard to the rotational positions of a support arm in the conventional example.

There is known a discrete track disc where servo tracks and data tracks are formed alternately in the circumferential direction on a magnetic disc, and both tracks are composed of a magnetic layer while any other region is composed of a nonmagnetic layer. In such discrete track disc, the width of the data track is smaller than the width of the recording head as shown in FIG. 4, so that a signal recording operation can be performed without causing any exudation or incomplete erasure in a recording mode.

However, even by the use of such a discrete track disc, when the off-track deviation becomes so great that the end of the recording head Hr scans the data track, some exudation or incomplete erasure is caused in the recording mode to eventually lose the merit of using a discrete track disc.

OBJECTS AND SUMMARY OF THE INVENTION

It is therefore an object of the present invention to provide a disc drive apparatus with a tracking servomechanism where, in a recording mode, the "just-tracking" position of a servo signal is scanned by a recording head in every track, hence preventing occurrence of any noise or read error that may otherwise be derived from a state where a data signal is recorded at the off-track position of the servo signal.

Another object of the present invention is to provide a disc drive apparatus with a tracking servomechanism which enables a recording head to scan each data track in a "just-tracking" one state to consequently record data signal properly even by the use of a discrete track disc as a recording medium.

According to one aspect of the present invention, there is provided a disc drive apparatus with a tracking servomechanism comprising at least one disc medium having data surfaces on which a plurality of concentric data tracks are formed, wherein a servo signal is recorded on at least one of the data surfaces as well as data signal; transducer means having a first head for reproducing the data signal from the data tracks in a playback mode, and a second head for recording the data signal on the data tracks in a recording mode; a rotary arm for supporting the transducer means at one end thereof while being held rotatably around an axis; actuator motor means for driving the rotary arm in a manner to move the transducer means over the data tracks; servo signal processing means for receiving and processing the servo signal reproduced by the transducer means and outputting a first servo control signal and a second servo control signal; and positioning control means for receiving the first and second servo control signals and controlling the actuator motor means in the playback and recording modes respectively in accordance with the first and second servo control signals so that the first head of the transducer means is positioned precisely on any selected one of the data tracks in the playback mode and also that the second head of the transducer means is positioned precisely on any selected one of the data tracks in the recording mode.

According to another aspect of the present invention, there is provided a disc drive apparatus with a tracking servomechanism comprising at least one disc medium having data surfaces on which a plurality of concentric tracks are formed, each of the tracks being divided into plural data tracks and plural servo tracks, wherein a data signal is recorded and reproduced by transducer means on and from the data tracks, while a servo signal is prerecorded and reproduced by the transducer means on and from the servo tracks; the transducer means having a first head for reproducing the data signal from the data tracks in a playback mode, and a second head for recording the data signal on the data tracks in a recording mode; a rotary arm for supporting the transducer means at one end thereof while being held rotatably around an axis; actuator motor means for driving the rotary arm in a manner to move the transducer means over the data tracks; servo signal processing means for receiving and processing the servo signal reproduced from the servo tracks and outputting a servo control signal; and positioning control means for receiving the servo control signal and controlling the actuator motor means in the playback and recording modes in accordance with the servo control signal; wherein the center of the servo tracks deviates from the center of the data tracks by an amount relative to a track address of the corresponding track, and the second head of the transducer means is positioned precisely on any selected one of the data tracks while the first head of the transudcer means is positioned precisely on the corresponding one of the servo tracks.

The above and other features and advantages of the present invention will become apparent from the following description which will be given with reference to the illustrative accompanying drawings.

DESCRIPTION OF THE PREFERRED EMBODIMENTS

Hereinafter a preferred embodiment of the present invention will be described with reference to the accompanying drawings.

Figure 5:
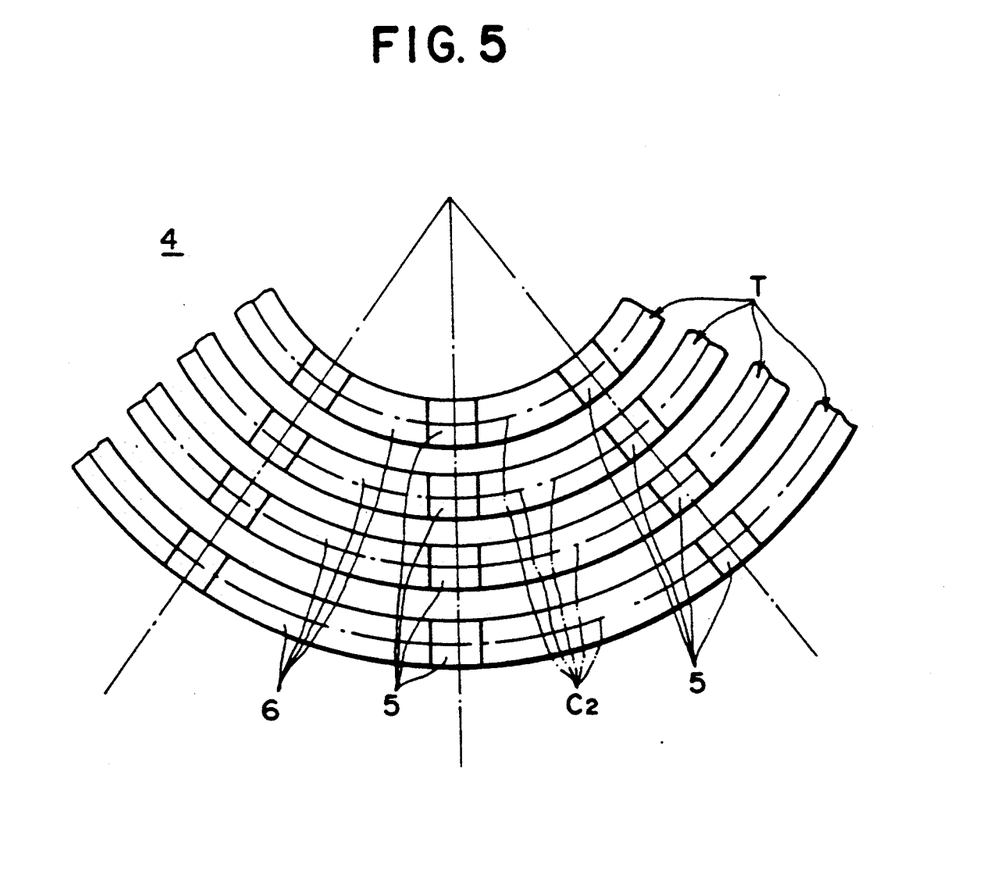
FIG. 5 illustrates a format on a disc employed in the present invention.

FIG. 5 illustrates a format on a disc employed in a disc drive apparatus to which the present invention is applied. This format is based on a sector servo system where a multiplicity of tracks T of mutually different radii are formed around the rotation center of the disc 4, and servo areas 5 are formed at equal intervals on each track T of the same radius. In the disc 4 based on such sector servo system, one sector is constituted of the servo area 5 and a data area 6 posterior thereto, and several tens of sectors are existent in such track.

Figure 6:
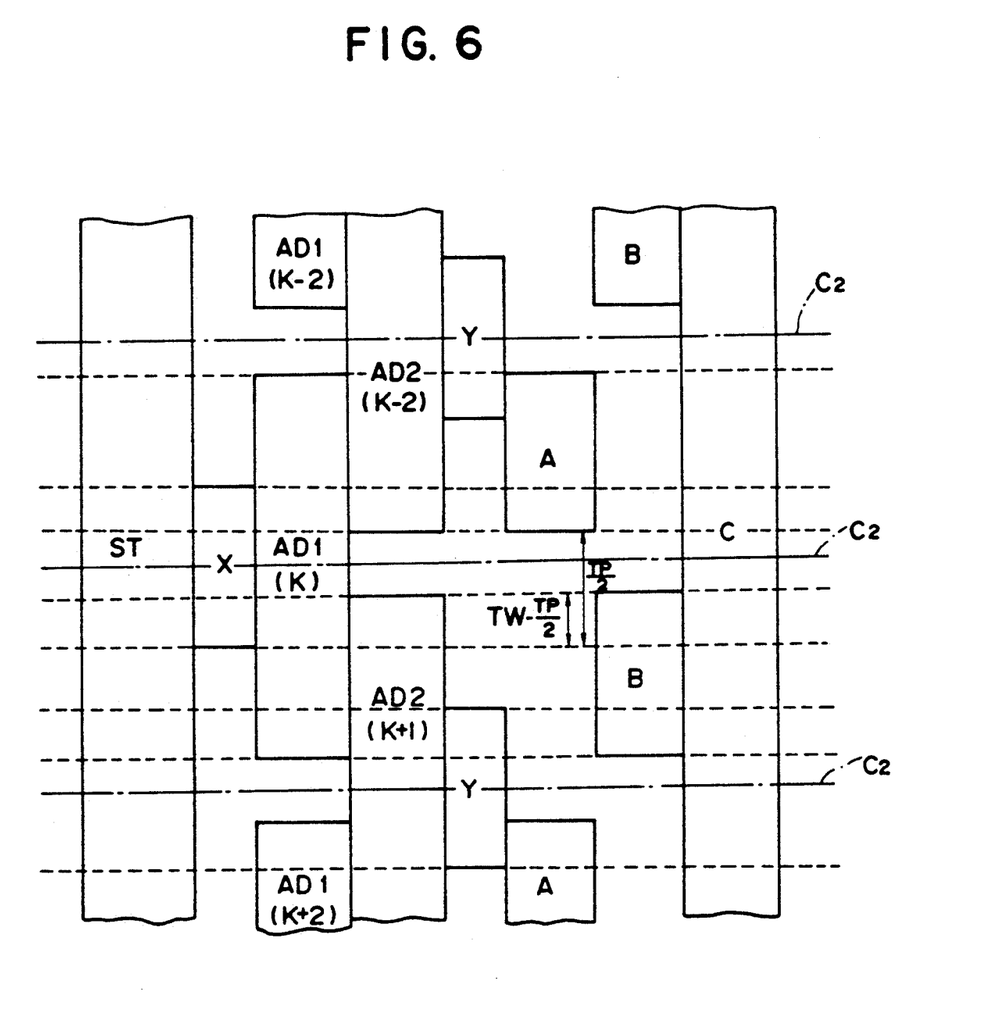
FIG. 6 illustrates a servo pattern of a servo area in the disc format.
Figure 7:
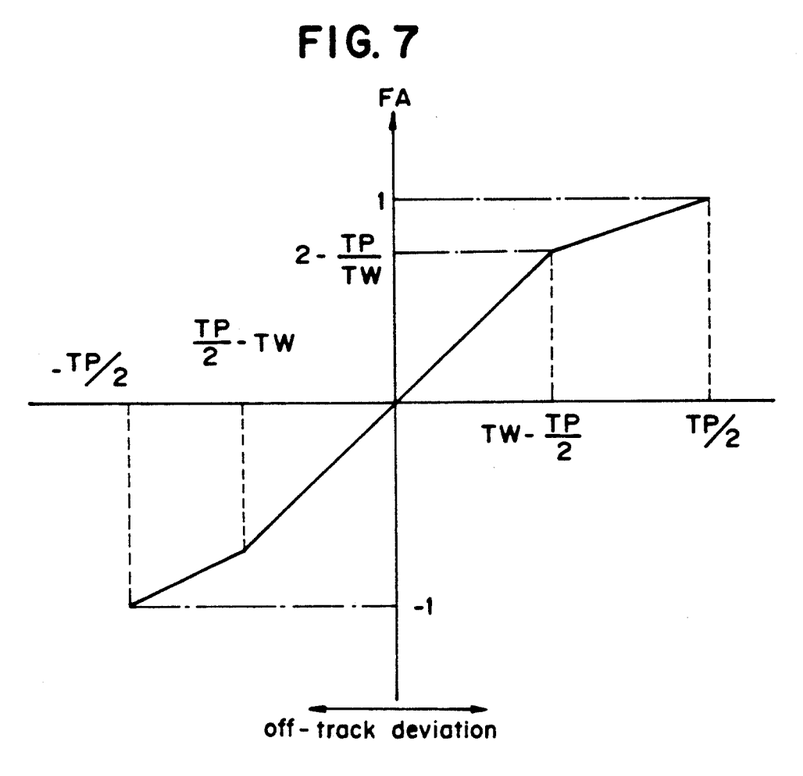
FIG. 7 graphically shows the off-tracking characteristic of a fine address servo.

FIG. 6 shows a servo pattern of the servo areas 5, and FIG. 7 graphically shows the off-tracking characteristics of a fine address servo. In FIG. 6, a sector head ST with a recorded sector start signal is formed in a head portion of the servo area 5, and address portions AD1 and AD2 with recorded track addresses are formed posterior to the sector head ST. Immediately anterior to the address portion AD1, there is formed a portion X where a burst signal representing an odd track is recorded; and immediately posterior to the address portion AD2, there is formed a portion Y where a burst signal representing an even track is recorded. The track address is detected by comparing the levels of X and Y with each other and adopting the address of the portion AD1 when $X>Y$ or the address of the portion AD2 when $X<Y$. Meanwhile, when $X=Y$, it is recognized that the playback head Hp is positioned between the tracks. Posterior to the address portions are portions A, B, C where signals A, B, C are recorded respectively. The portions A and B are formed at different positions in the longitudinal direction of the track while being spaced apart slightly from the track center line C2 and are provided integrally with the portions A and B of the adjacent track. Meanwhile the portion C is formed continuously with the corresponding portion of the adjacent track so as to be picked up without fail by the playback head Hp regardless of the scanning course thereof. A calculation of $(A-B)/C$ is executed and then a value FA proportional to the off-track deviation from the track center line C2 as shown in FIG. 7 is computed to detect a fine address FA. In FIG. 7, TP stands for a track pitch, and TW for a track width. The present address of the playback head Hp can be obtained by combining the aforementioned track address with the fine address thus detected.

Figure 8:
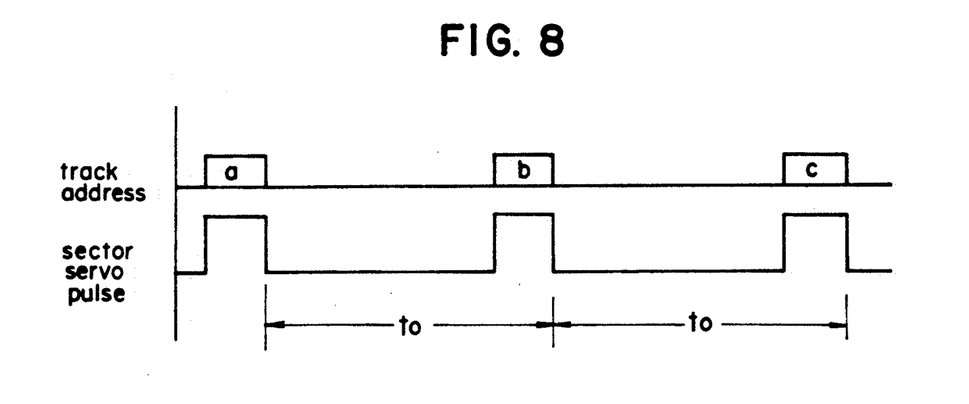
FIG. 8 is a timing chart of receiving track addresses in a track seek mode.

FIG. 8 is a timing chart of receiving track addresses in a track seek mode. In FIG. 8, track addresses outputted from the playback head Hp are received synchronously with sector servo pulses in the track seek mode, and the head displacement speed V can be obtained by executing a calculation of $(|a-b|TP)/t_o$ (where a and b represent addresses received successively).

Figure 9:
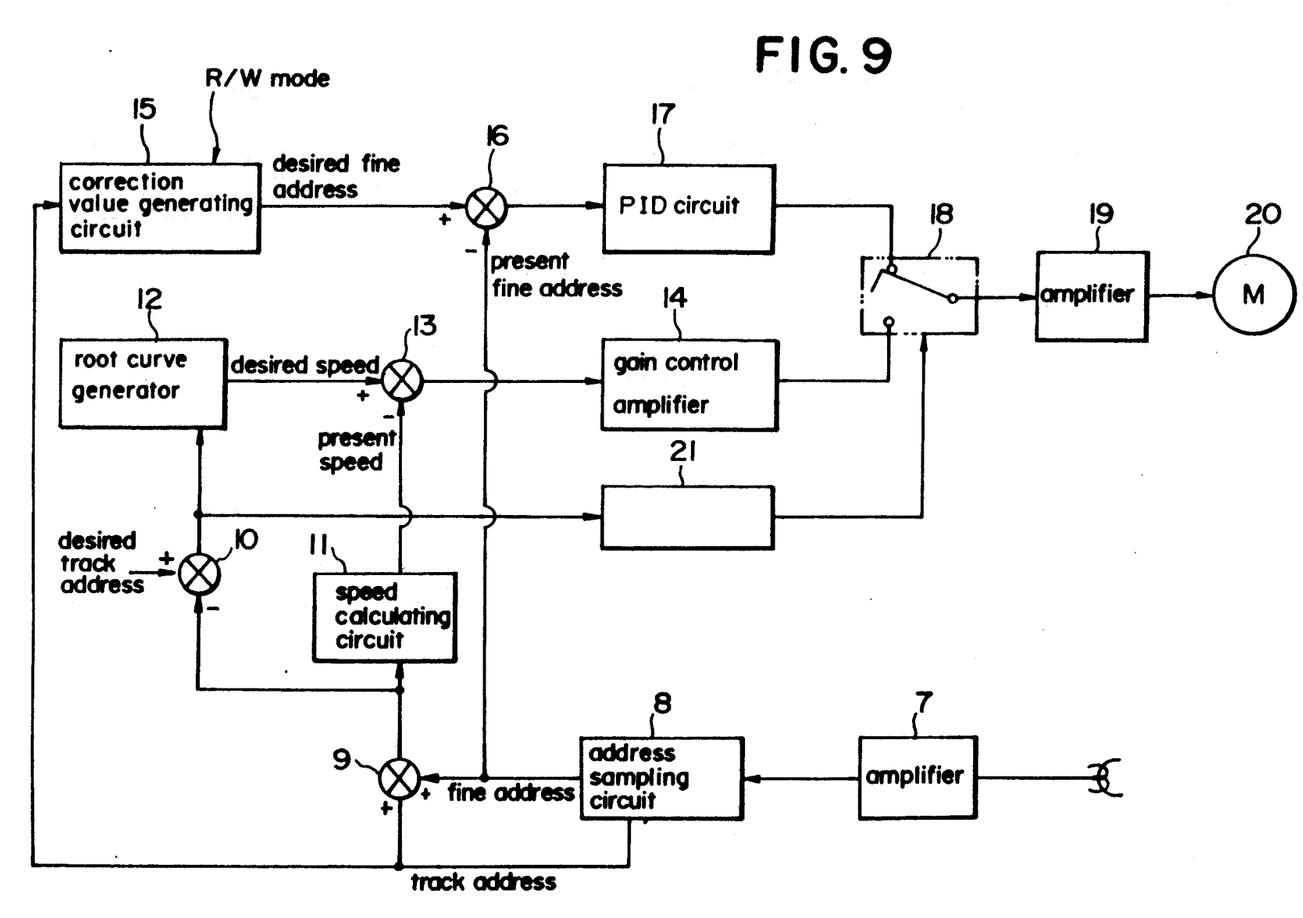
FIG. 9 is a circuit block diagram of a tracking servomechanism in an embodiment of the present invention.
Figure 10:
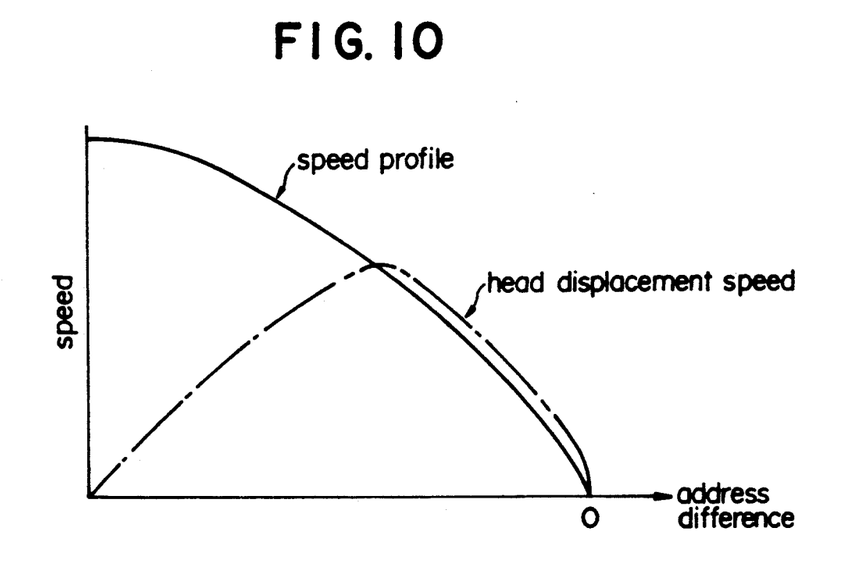
FIG. 10 graphically shows a speed profile characteristic curve obtained in the embodiment of FIG. 9.

FIG. 9 is a circuit block diagram of a track service mechanism. In this diagram, an output signal of the playback head Hp is fed via an amplifier 7 to an address sampling circuit 8, which then samples a track address and a fine address. The fine address is obtained from a calculation of $(A-B)/C$ as described above, and the resultant value (C to ±1) is converted into a digital percent value, for example, by means of an A-D (analog-to-digital) converter. Both the track address and the fine address are fed to an adder 9, where the values are added to each other so that the present address is obtained. The present address is supplied to a subtracter 10 and a speed calculating circuit 11. The subtracter 10 is supplied also with a desired address, and an address difference obtained by subtracting the present address from the desired address is supplied to a root curve generator 12. This generator 12 has speed information which corresponds to the address difference and represents the speed profile characteristic shown graphically in FIG. 10. A desired speed based on such characteristic is supplied to a subtracter 13. The speed calculating circuit 11 receives the present address in synchronism with the sector servo pulse and executes a calculation of $|a-|b\ TP/t_o$ as described above to thereby compute a head displacement speed. The present speed thus obtained is supplied to the subtracter 13, which substracts the present speed from the desired speed to calculate the speed difference and then supplies the speed difference data to a gain control amplifier 14.

Figure 11:
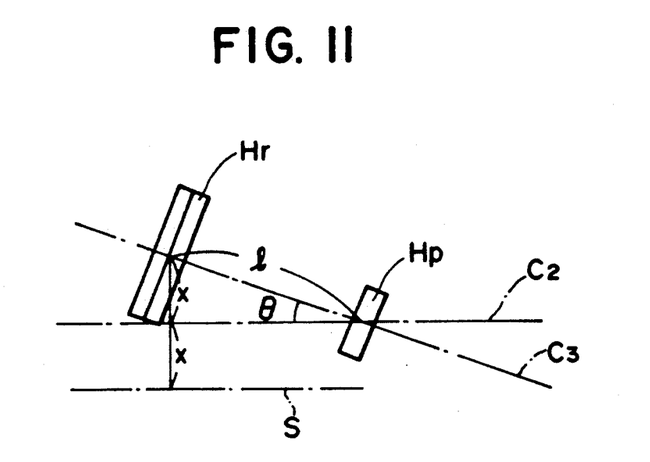
FIG. 11 illustrates how a shift length is calculated in the embodiment of FIG. 9.

Meanwhile, the track address from the address sampling circuit 8 and a mode signal indicating either a playback state or a recording state of the drive apparatus are inputted to a correction value generating circuit 15, which calculates the corrected fine address in accordance with the input track address. The calculation of the corrected fine address is executed in the following manner. In FIG. 11, l represents the distance between the playback head Hp and the recording head Hr, and θ represents the angle formed by the center line C2 of a corrected track and the head center line C3, wherein a shift length X of the recording head Hr in the radial direction of the disc with respect to the playback head Hp is obtained by calculating an equation $X=l\sin\theta$. A fine address corresponding to a position S which is displaced by such shift length X in the reverse direction is determined to be the corrected fine address. In a recording mode, the corrected fine address thus obtained is outputted to a subtracter 16; and in a playback mode, a zero value (a "just-tracking" position) is outputted continuously as the corrected fine address. The fine address (present fine address) from the address sampling circuit 8 is inputted to the subtracter 16, and the fine address difference obtained by subtracting the present fine address from the desired fine address is outputted to a PID (proportional-integral-derivative) circuit 17. Either the output of such PID circuit 17 or the output of the aforementioned gain control amplifier 14 is selected by a selector switch 18, and the selected output is fed via an amplifier 19 to a motor 20 provided for driving the support arm. The action of the selector switch 18 is controlled by a switching control circuit 21 which receives the track address difference information from the subtracter 10. Upon start of the track seek mode, a control signal is outputted for selectively turning the switch 18 to the side of the gain control amplifier 14. When the track address difference is reduced to be within $\pm\frac{1}{4}$ TP (track pitch), another control signal is outputted for changing the switch 18 to the side of the PID circuit 17.

Now the function of the above constitution will be described below.

Figure 12:
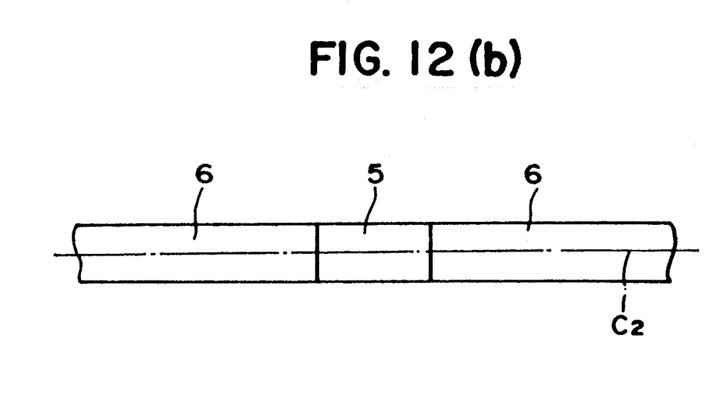
FIG. 12(a) illustrates a scanning state of heads in a recording mode in the embodiment.
FIG. 12(b) illustrates a recording state in the embodiment.

Upon start of the track seek mode during the operation in the recording mode, the selector switch 18 is changed to connect the gain control amplifier 14. The address sampling circuit 8 samples a track address and a fine address from the playback output picked up by the playback head Hp, whereby the present address is obtained as an output of the adder 9. In the root curve generator 12, the desired speed data based on the speed profile characteristic is calculated from the address difference data and then is outputted to the subtracter 13. Meanwhile in the speed calculating circuit 11, the present speed is calculated from the present address fed thereto sequentially and then is outputted also to the subtracter 13. A driving control signal proportional to the speed difference is outputted from the gain control amplifier 14 to thereby control the rotation speed of the support arm 1. This rotation speed corresponding to the displacement speed of the playback head Hp is linearly increased to be approximate to the initial speed in the speed profile characteristic curve as indicated by a one-dot chained line in FIG. 10. Upon arrival at the speed in the speed profile characteristic curve, the control action is so executed as to attain a coincidence between the desired speed and the present speed, whereby the rotation speed is reduced in conformity with the speed profile characteristic. Upon the track address difference has been decreased to a range of $\pm\frac{1}{4}$ TP, the selector switch 18 is changed to the position of the PID circuit 17 by the control signal fed from the switching control circuit 21. The decrease of the track address difference to a range of $\pm\frac{1}{4}$ TP signifies that the playback head Hp has arrived at the desired track, so that the address of the corrected track is inputted from the address sampling circuit 8 to the correction value generating circuit 15. Then this circuit 15 outputs a corrected fine address corresponding to the input track address, and the PID circuit 17 outputs a driving control signal corresponding to the position difference, thereby controlling the rotational position of the support arm 1. As illustrated in FIG. 12(a), the center position of the playback head Hp is set properly at the corrected fine address, so that the recording head Hr comes to scan the "just-tracking" position exactly on the desired track. Therefore, in the data area 6, the data signal is recorded at the position coincident with the track center line C2 as illustrated in FIG. 12(b).

In the playback mode, the correction value generating circuit 15 continuously outputs a zero value as the corrected fine address, so that the playback head Hp can be kept at the just-track position on the track contact line C2 to consequently reproduce a proper playback signal.

Although the embodiment mentioned is concerned with an exemplary case of applying the present invention to a sector servo system, it is to be understood that the present invention is applicable also to a different servo system for recording a servo signal in a deep layer of a disc. And the present invention is further applicable to another servo system which uses a reference track with calculation of linear interpolation as disclosed in U.S. Pat. No. 4,122,503.

According to the present invention, as described hereinabove, a playback head and a recording head are secured individually to a rotary support arm in a disc drive apparatus, and such playback head and recording head are moved substantially in the radial direction of a disc by the rotation of the support arm, wherein, during a recording mode, a shift length of the recording head in the radial direction of the disc is calculated with respect to the playback head at a desired track position, and a control action is so executed as to cause off-tracking of the playback head by the calculated shift length in the reverse direction. Consequently, the recording head scans the center line of the servo signal track and writes a data signal at a position coincident with the center of the servo signal track. Thus, in the playback mode, there is attainable a remarkable effect of eliminating any noise or read error that may result from the off-track scanning.

Figure 13A:
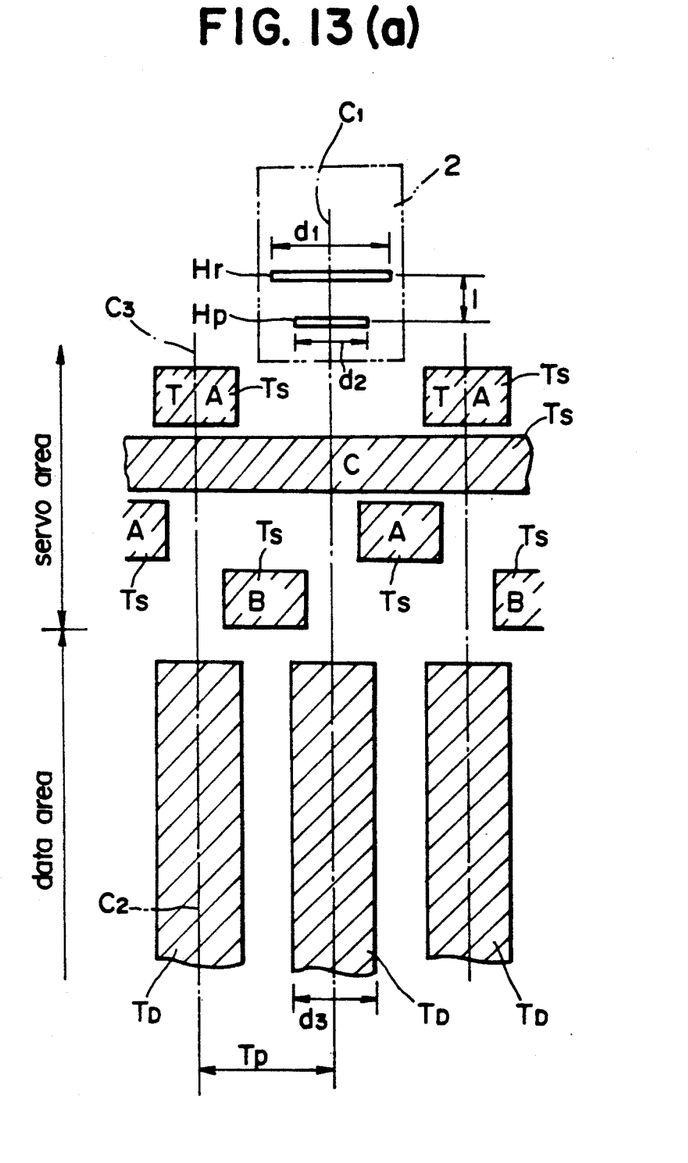
FIG. 13(a) illustrates a pattern of an innermost track.
Figure 13B:
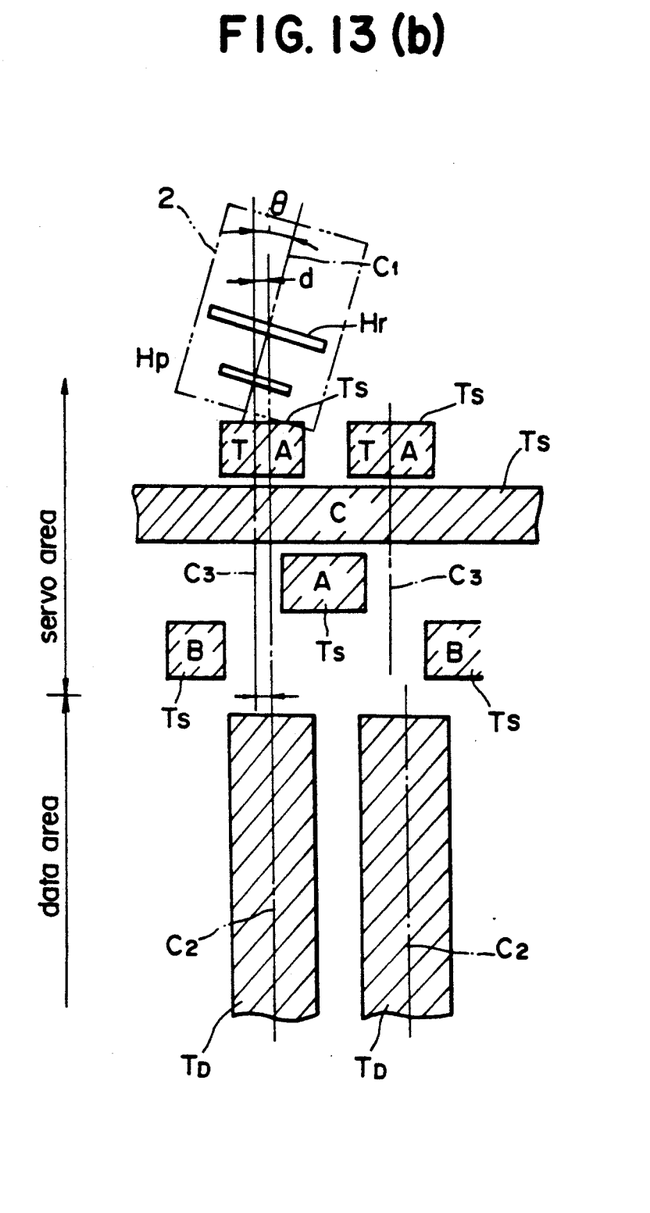
FIG. 13(b) illustrates a pattern of a track other than the innermost track.
Figure 14:
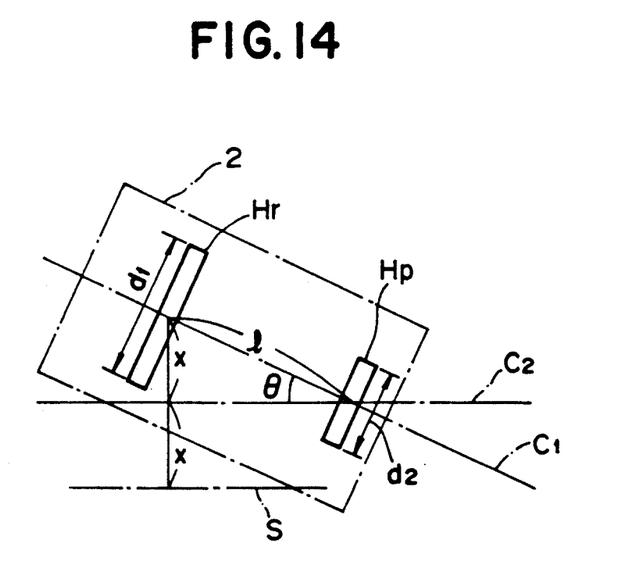
FIG. 14 illustrates how a shift length is calculated in another embodiment of the present invention.

Hereinafter another preferred embodiment of the present invention employing a discrete track disc will be described with reference to the accompanying drawings. The disc used in this embodiment also has a format pattern of FIG. 5 with servo sectors and data sectors arrayed alternately. FIG. 13 illustrates the detail of such format pattern, wherein each servo area $E_S$ includes a servo track $T_S$, and each data area $E_D$ includes a data track $T_D$. The servo tracks $T_S$ and the data tracks $T_D$ denoted with oblique lines are composed of a magnetic layer, while any other region is composed of a nonmagnetic layer. The servo track $T_S$ comprises a track address portion $T_A$ and three fine address portions A, B, C. A track address signal is recorded in the track address portion $T_S$, while burst signals of one frequency are recorded in the fine address portions A, B, C. The off-track deviation from the center line C3 of the servo track $T_S$ is obtained by calculating an expression $(A-B)/C$ in accordance with the burst signal outputs picked up, and when the width d3 of the fine address portions A and B is rendered equal to the width d2 of the playback head Hp, the servo characteristics can be enhanced to bring about a satisfactory result. The data track $T_D$ is a region for recording a data signal, and its width is determined to be smaller than the width d1 of the recording head Hr but greater than the width d2 of the playback head Hp. At the innermost track Ti, as shown in FIG. 13(a), the center line C3 of the servo track $T_S$ becomes coincident with the center line C2 of the data track $T_D$. However, at any track other than the innermost track Ti, as shown in FIG. 13(b), the center line C3 of the servo track $T_S$ is shifted from the center line C2 of the data track $T_D$. Such shifted position is denoted by S in FIG. 14 and is set by calculating a shift length X of the recording head Hr in the radial direction of the disc with respect to the playback head Hp at each rotational position of the support arm 1 and then shifting the center line C3 by such calculated length X in the reverse direction. The shift length X can be obtained by calculating an equation $X = 1 \sin \theta$, in which 1 denotes the distance between the playback head Hp and the recording head Hr, and $\theta$ denotes the skew angle formed by the track center line C2 and the center line C1 of the support arm 1. The shift length X becomes greater toward the outermost track.

Now the function of the above constitution will be described below.

When the playback head Hp scans the servo track $T_S$ in a playback mode, the playback head Hp picks up a track address signal and a burst signal. The present track address being scanned is identified from the track address signal thus picked up, while the off-track deviation is detected from the burst signal, whereby the playback head Hp is kept scanning the servo track $T_S$ in a just-tracking state. At the innermost track Ti, as shown in FIG. 13(a), the playback head Hp and the recording head Hr are not shifted in the radial direction of the disc, so that the center line C3 of the servo track $T_S$ and the center line C2 of the data track $T_D$ are positionally coincident with each other. Therefore, both the playback head Hp and the recording head Hr scan the data track Tp in a just-tracking state. Meanwhile at any track other than the innermost track Ti, the playback head Hp and the recording head Hr are shifted in the radial direction of the disc as shown in FIG. 13(b), but since the center line C3 of the servo track $T_S$ is shifted from the center line C2 of the data track $T_D$ correspondingly to the above shift length, the playback head Hp scans the off-track position while the recording head Hr scans the "just-tracking" position. Consequently, the recording head Hr keeps scanning the just-track position on the data track $T_D$ and therefore records data signal properly on the data track $T_D$ without any exudation or incomplete erasure in the recording mode. Meanwhile the playback head Hp scans the off-track position on the data track $T_D$. However, since the playback head Hp is formed to be narrower than the data track width, the end of the playback head Hp never protrudes outside the data track $T_D$ to eventually induce none of impediments to the signal reproduction.

As described hereinabove, in a magnetic disc apparatus where a playback head and a recording head are attached individually to a rotary support arm and a discrete track disc is employed as a recording medium, the head positioning system of the present invention calculates a shift length of the recording head in the radial direction of the disc with respect to the playback head at each rotational position of the support arm, and then shifts the center of the servo track in the reverse direction by the calculated shift length from the center of the data track. Therefore the recording head scans the data track in a "just-tracking" state to eventually ensure a proper data signal recording operation without causing any exudation or incomplete erasure in the recording mode. Meanwhile the playback head scans the data track with an off-track deviation. However, since the playback head is generally formed to be narrower than the data track, it is possible for the playback head to scan the data track without protrusion therefrom, hence attaining an advantageous effect that eliminates any impediment to the signal reproduction.

What is claimed is:

1. A disc drive apparatus with a tracking servo-mechanism comprising:
    at least one magnetic disc having data surfaces on which a plurality of concentric data tracks are formed, each of said tracks being divided into plural data tracks and plural servo tracks, wherein magnetic material is provided only on said data tracks and said servo tracks and a data signal is recorded and reproduced by transducer means on and from said data tracks, while a servo signal is prerecorded on and reproduced by transducer means on and from said servo tracks;

transducer means having a first head for reproducing said data signal from said data tracks in a playback mode, and a second head for recording said data signal on said data tracks in a recording mode;

a rotary arm for supporting said transducer means at one thereof, said rotary arm being rotatably held around an axis;

actuator motor means for driving said rotary arm in a manner to move said transducer means over said data tracks;

servo signal processing means for receiving and processing said servo signal reproduced by said transducer means and outputting a first servo control signal and a second servo control signal; and positioning control means for receiving said first and second servo control signals and controlling said actuator motor means in the playback and recording modes respectively in accordance with said first and second servo control signals so that said first head of said transducer means is positioned precisely on any selected one of said data tracks in the playback mode and also that said second head of said transducer means is positioned precisely on any selected one of said data tracks in the recording mode;

wherein the center of said servo tracks deviates from the center of said data tracks by an amount relative to a track address of the corresponding track, and said second head of said transducer means is positioned precisely on any selected one of said data tracks while said first head of said transducer means is positioned precisely on the corresponding one of said servo tracks.

2. A disc drive apparatus according to claim 1, wherein the difference between said first and second servo control signals corresponds to the position difference between said first and second heads with respect to the track center at said selected one of said data tracks.

3. A disc drive apparatus according to claim 2, wherein said servo signal comprises a coarse servo signal indicating a track address of the corresponding data track, and a fine servo signal indicating a track center of the corresponding data track, said fine servo signal comprising first and second signals prerecorded on each side of said track center respectively; and the signal levels of said first and second signals detected by said first head are the same when the center of said first head is aligned with the center of the corresponding data track.

4. A disc drive apparatus according to claim 3, wherein the signal levels of said first and second signals detected by said first head are the same in the playback mode, and the signal levels of said first and second signals detected by said first head are different in said recording mode.

5. A disc drive apparatus according to claim 1 wherein the width of said first head is narrower than that of said second head.

6. A disc drive apparatus with a tracking servo-mechanism comprising:

at least one magnetic disc having data surfaces on which a plurality of concentric tracks are formed, each of said tracks being divided into plural data tracks and plural servo tracks, wherein magnetic material is provided only on said data tracks and said servo tracks and a data signal is recorded and reproduced by transducer means on and from said data tracks, while a servo signal is prerecorded and reproduced by said transducer means on and from said servo tracks;

said transducer means having a first head for reproducing said data signal from said data tracks in a playback mode, and a second head for recording said data signal on said data tracks in a recording mode;

a rotary arm for supporting said transducer means at one end thereof, said rotary arm being rotatably held around an axis;

actuator motor means for driving said rotary arm in a manner to move said transducer means over said data tracks;

servo signal processing means for receiving and processing said servo signal reproduced from said servo tracks and outputting a servo control signal; and positioning control means for receiving said servo control signal and controlling said actuator motor means in the playback and recording modes in accordance with said servo control signal;

wherein the center of said servo tracks deviates from the center of said data tracks by an amount relative to a track address of the corresponding track, and said second head of said transducer means is positioned precisely on any selected one of said data tracks while said first head of said transducer means is positioned precisely on the corresponding one of said servo tracks.

7. A disc drive apparatus according to claim 6, wherein the width of said first head is narrower than that of said second head.

8. A disc drive apparatus according to claim 6, wherein said first head is of a magnetoresistive type.

9. A disc drive apparatus with a tracking servo-mechanism, comprising:

a magnetic disk having data surfaces on which a plurality of concentric tracks are formed, each of said tracks being divided into plural data tracks and plural servo tracks wherein magnetic material is provided only on said data tracks and said servo tracks, and wherein the center of said servo tracks deviates from the center of said data tracks by an amount relative to a track address of the corresponding track, and wherein a data signal is recorded and reproduced by transducer means on and from said data tracks and a servo signal is prerecorded and reproduced by said transducer means on and from said servo tracks;

said transducer means having a first head for reproducing said data signal from said data tracks in a playback mode, and a second head for recording said data signal on said data tracks in a recording mode;

means for supporting said transducer means relative to said magnetic disk and moving said transducer means over at least said data tracks;

means receiving said servo signal from said servo tracks and outputting a servo control signal representative thereof; and positioning control means responsive to said servo control signal for controlling said supporting and moving means in accordance with said servo control signal, wherein said second head of said transducer means is positioned precisely on any selected one of said data tracks while said first head of said transducer means is positioned precisely on the corresponding one of said servo tracks.

* * * * *